Jan. 7, 1958   F. J. KAEHNI ET AL   2,819,389
HIGH FREQUENCY DETECTOR
Original Filed March 30, 1944                    2 Sheets-Sheet 1

INVENTORS
Frank J. Kaehni
William L. Kaehni, Deceased
BY Frank J. Kaehni, Executor

THEIR ATTORNEYS

United States Patent Office 2,819,389
Patented Jan. 7, 1958

2,819,389

HIGH FREQUENCY DETECTOR

Frank J. Kaehni, Cleveland, Ohio, and William Louis Kaehni, deceased, late of Cleveland, Ohio, by Frank J. Kaehni, executor, Cleveland, Ohio Original application March 30, 1944, Serial No. 528,689, now Patent No. 2,587,481, dated February 26, 1952. Divided and this application July 27, 1951, Serial No. 238,934

4 Claims. (Cl. 250—20)

The invention described and claimed in this application relates to a new form of high frequency detector which is useful for the detection and orientation of radio waves in ultra high frequencies above the range in which the conventional triode performs satisfactorily. The application is a division of an application filed on March 30, 1944, Serial No. 528,689. The detector comprises a high vacuum diode, the operation of which is controlled by the magnetic component of radio waves being detected and oriented rather than by the electrostatic component of the waves as is the case with the conventional triode. The detector comprises a circuit having a diode vacuum tube with an electron emitting cathode and a cylindrical anode concentric with said cathode and maintained at a higher potential than that of the cathode, current responsive means in the anode circuit and means for maintaining a unidirectional magnetic field in the space between the cathode and anode in a direction parallel to the longitudinal axis of said cathode and anode, said space between the cathode and anode also being pervaded by the high frequency magnetic field forming part of the wave to be detected and applied directly to the tube or pervaded by a corresponding high frequency magnetic field derived from further means responsive directly to the wave, for example a circuit tuned to the incoming wave, the said wave being applied externally to the tube without passing through any prior tube in the circuit whereby the variations in the resultant magnetic field will bring about a corresponding deflection in the path of the electrons in said space and, with the tube adjusted to operate near the cut-off point of its cathode-anode current versus magnetic field characteristic a current varying in accordance with variations in the wave to be detected will flow through said means in the anode circuit.

In the accompanying drawings we have illustrated certain present preferred embodiments of our invention, in which.

Figure 1:
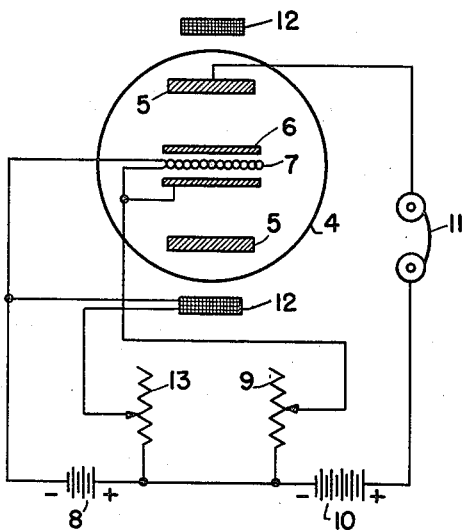
Figure 1 is a longitudinal vertical section through a diode tube made in accordance with this invention, electrical connections for the operation of the tube being shown diagrammatically.

A tube constructed in accordance with this invention comprises an enclosure 4 preferably made of glass within which a high vacuum is established. Within the glass enclosure the tube has a cylindrical anode 5, the length of which is of the same order of magnitude as its radius. A cathode 6 is positioned in the enclosure 4 concentrically within the anode 5. Preferably, this cathode is coated with electron emitting material and is indirectly heated by a filament 7, current for this heating filament being supplied by a battery 8 connected to the filament through a variable resistance 9. The anode 5 and cathode 6 are connected into a plate circuit comprising the variable resistance 9, the battery 10 and earphones 11. An electromagnetic coil 12 surrounds the diode in such a manner that magnetic lines of force generated when a voltage is applied to the coil flow through the space between the anode 5 and cathode 6. The battery 8 supplies current for the coil 12 through a variable resistance 13. If battery power is not available, current for the filament 7 can be supplied by the secondary winding of a transformer and current for the coil 12 and for the anode circuit can be supplied from a rectified and filtered source of alternating current. The polarizing coil 12 can also be replaced by polarizing permanent magnets.

The diode just described employs some of the principles of operation of a magnetron; that is, the flow of magnetic lines of force through the tube is utilized to control the flow of current through the plate circuit, variations in the strength of the magnetic lines of force creating corresponding variations in the plate current. Thus, in the tube shown in Figure 1 whenever the cathode 6 is heated it will give off electrons and if a voltage is applied between the anode 5 and the cathode 6, the electrons will flow from the cathode to the anode creating a plate current. If, however, magnetic lines of force are caused to pass through the space between the cathode and the anode, these lines of force will deflect the electrons and if the tube is sufficiently sensitive, they may completely cut off the flow of electrons to the anode. It follows that if the magnetic lines of force vary in strength, corresponding variations in the current in the plate circuit will be obtained.

As indicated above the diode disclosed in this application employs some of the principles of the magnetron. However, there are several important differences between the magnetron and the tube just described which have been found to be useful when dealing with extremely weak magnetic fields. Thus, the diode is designed to operate with low plate voltages in the order of from one to forty-five volts. A relatively short anode is also used. That is, the length of the anode is of the same order of magnitude as its radius and a relatively large space is provided between the anode and the cathode. We have also found that it is important that the cathode be arranged concentrically with the anode and that an equipotential cathode be used, i. e., a cathode which has the same potential difference in response to the anode along its entire length. For this reason an indirectly heated cathode as is shown in Figure 1 is employed. It has further been found to be important that the tube be made of non-magnetic materials, particularly the anode.

Figure 2:
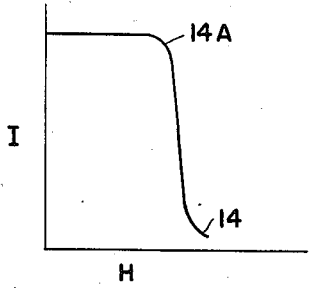
Figure 2 is a characteristic curve of the tube shown in Figure 1.

Such a tube produces a characteristic curve such as is shown in Figure 2 in which plate current I is plotted against the value H of the magnetic fields passing through the diode. From Figure 2 it will be noted that at a certain value of H a very slight change in the strength of a magnetic field passing through the tube will cause a very large change in plate current so that it is possible to obtain a complete cut off even with weak magnetic fields.

A tube such as is shown in Figure 1 is mounted for rotation so that it can be oriented so that the magnetic component of a broadcast radio wave passes through the tube in a direction parallel to the axis of the cathode and anode. Variations in the magnetic component will then produce corresponding variations in the plate current which can be detected in the phones 11, provided the diode is properly adjusted to operate at the sharp cut off value of the characteristic curve of the tube (the points 14 and 14A in Figure 2). The electromagnetic coil 12 is used to supply a unidirectional magnetic field which passes through the diode so as to add to or oppose the strength of the magnetic component of the radio wave as it alternates within the tube. The strength of the constant magnetic field is adjusted by means of the variable resistance 13 so that the tube will operate at the sharp cut off point on the characteristic curve.

Figure 3:
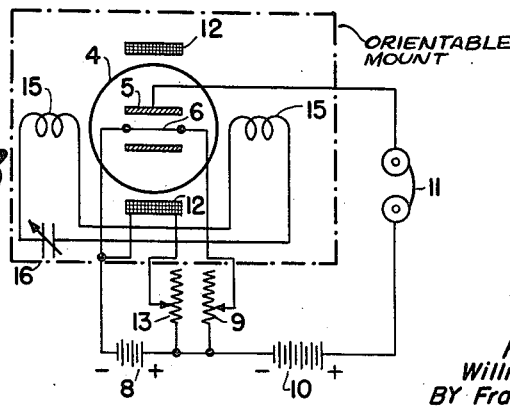
Figure 3 is an electrical circuit diagram showing the use of a tube similar to that shown in Figure 1 in connection with a tuned resonant circuit.

With the tube operating at the sharp cut off point of the curve it will act as a detector or rectifier. The high frequency detector just described above will pick up the magnetic components of all radio waves being broadcast at any particular moment provided that the tube is oriented so that the magnetic components of the waves pass axially through the anode of the tube. In Figure 3 there is shown a circuit by which a detector, such as shown in Figure 1, can be tuned to a radio wave operating at a particular frequency. In Figure 3 there is shown a tube having the same components as the tube shown in Figure 1 except that Figure 3 shows a hot wire cathode. It has been found that a hot wire cathode will perform satisfactorily, although not as well as an indirectly heated cathode, if the plate voltage is low, the cathode is short, and a strong radio wave is being detected. To the tube there is added a resonant circuit comprising inductances 15, and a variable capacity 16. The inductances 15 are positioned relative to the tube so that magnetic lines of force created by current passing through the inductances will also pass through the tube axially of the anode 5. If the circuit comprising the inductances 15 and condenser 16 is tuned so that it is resonant with a radio wave being broadcast, variations in the magnetic component in the radio wave will generate a current in the inductances 15 which current will oscillate in the circuit. This oscillating current will in turn set up fluctuating magnetic lines of force which pass between the anode and cathode in the tube. Variations in the strength of this magnetic field will induce corresponding variations in the plate circuit which will be picked up in the phones 11. These plate circuit variations can be amplified by conventional electronic means when greater sensitivity is required. The effect of the resonant circuit is therefore to emphasize a radio wave of a particular frequency or band of frequencies which are in resonance with the resonant circuit as it is tuned.

The tube and the resonant circuit are mounted so that they can be rotated as a unit to orient them with respect to a radio wave. It has been found that the resonant circuit will itself act as an antenna which may be rotated directionally in combination with the associated vacuum tube as a single unit. A suitable mount for rotating the associated parts, i. e., the resonant circuit, the tube, and the polarizing coil 12, is indicated by a chain line and legend in Figure 3.

Figure 4:
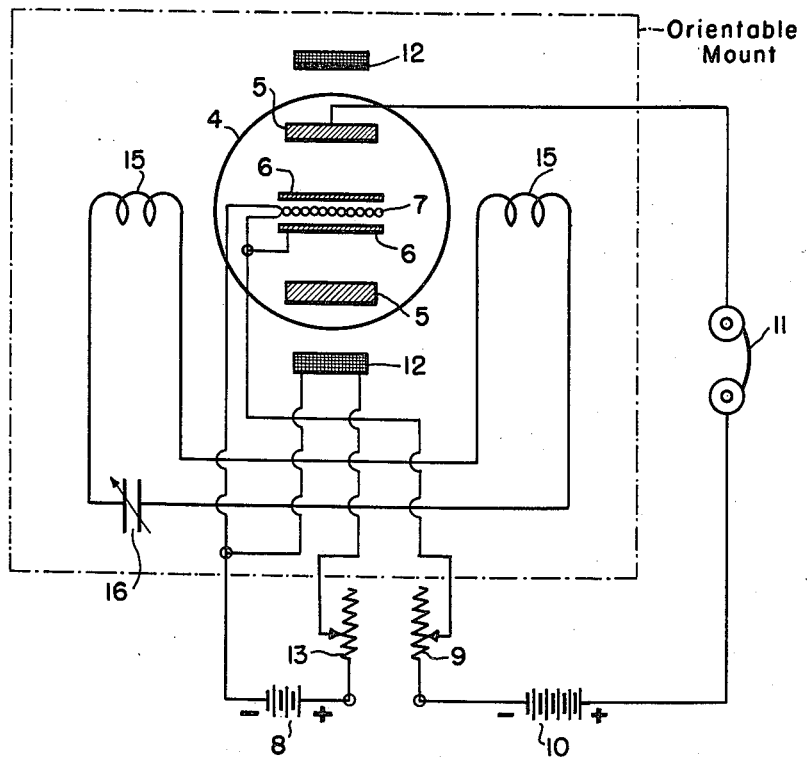
Figure 4 is an electrical circuit diagram similar to Figure 3.

Figure 4 shows a detector circuit which is the same as that shown in Figure 3 except that the tube 4 employs an equipotential cathode rather than a hot wire cathode as shown in Figure 3. The equipotential circuit shown in Figure 4 may be the same in construction as the cathode shown in the tube 4 in the circuit shown in Figure 1. That is to say, the cathode comprises a tube 6 preferably coated with electron emitting material which is indirectly heated by a filament supplied by a battery 8. The operation of the detector illustrated diagrammatically in Figure 4 is the same as that shown in Figure 3.

The circuit shown in Figure 3 can also be used to detect a frequency modulated wave. In such case, the tuning circuit is tuned to one end of the frequency band being received. A maximum response of plate current will be obtained whenever the frequency of the radio wave being detected shifts to the end of the frequency band for which the tuning circuit has been set. As the frequency of the radio wave being received shifts from the frequency at which maximum response is obtained, there will be a corresponding shift in the response of the plate circuit; that is, the further the frequency of the radio waves shifts from the frequency of maximum response in the plate circuit, the weaker will be the response in the plate circuit. In this way response variations will result from transmitted frequency variations.

From the foregoing it is apparent that the invention here described is extremely useful for the detection of radio waves having a frequency so high that they cannot satisfactorily be detected by means of the conventional triode. The triode is actuated by the electrostatic component of a radio wave and variations in this component are absorbed by the capacity of the grids, plates and cathodes of the triode if the radio wave has a high frequency. In the detector described in this application the magnetic component of a radio wave acts directly on the electrons themselves in the tube. Capacity effects are eliminated and inertia effects are practically nil. Therefore extremely high frequencies can be handled. If the tube is constructed as described above, an extremely steep characteristic curve can be obtained even for extremely weak radio waves. Moreover, the detector can be used both for amplitude and frequency modulated waves.

While certain present preferred embodiments of the invention have been described above, it is to be understood that the invention may be otherwise embodied within the scope of the following claims.

We claim:

1. A high frequency detector comprising a diode vacuum tube having a central longitudinal axis and electrodes paralleling the axis, means for supplying cathode heating current and anode potential, current responsive means in the anode circuit, means for producing an adjustable unidirectional magnetic field parallel to the axis of the tube, a resonant circuit including an inductance and capacitor, the inductance being so positioned relative to the tube that the magnetic field from the inductance is superimposed upon said unidirectional field, and mounting means for positioning said tube, resonant circuit and unidirectional magnetic field in fixed position relative to each other and for moving them as a unit to orient the inductance of the resonant circuit relative to the magnetic component of a radio frequency wave whereby said component may induce directly a current in the inductance of said resonant circuit and modulate the anode circuit.

2. A high frequency detector comprising a diode vacuum tube having a central longitudinal axis and electrodes paralleling the axis, one of said electrodes being an equipotential cathode, means for supplying cathode heating current and anode potential, current responsive means in the anode circuit, means for producing an adjustable unidirectional magnetic field parallel to the axis of the tube, a resonant circuit including an inductance and capacitor, the inductance being so positioned relative to the tube that the magnetic field from the inductance is superimposed upon said unidirectional field, and mounting means for positioning said tube, resonant circuit and unidirectional magnetic field in fixed position relative to each other and for moving them as a unit to orient the inductance of the resonant circuit relative to the magnetic component of a radio frequency wave whereby said component may induce directly a current in the inductance of said resonant circuit and modulate the anode circuit.

3. A high frequency detector comprising a diode vacuum tube having a central longitudinal axis and electrodes paralleling the axis, one of said electrodes being an anode made of non-magnetic material, means for supplying cathode heating current and anode potential, current responsive means in the anode circuit, means for producing an adjustable unidirectional magnetic field parallel to the axis of the tube, a resonant circuit including an inductance and capacitor, the inductance being so positioned relative to the tube that the magnetic field from the inductance is superimposed upon said unidirectional field, and mounting means for positioning said tube, resonant circuit and unidirectional magnetic field in fixed position relative to each other and for moving them as a unit to orient the inductance of the resonant circuit relative to the magnetic component of a radio frequency wave whereby said component may induce directly a current in the inductance of said resonant circuit and modulate the anode circuit.

4. A high frequency detector comprising a diode vacuum tube having a central longitudinal axis and electrodes paralleling the axis, one of said electrodes being an equipotential cathode and the other of said electrodes being an anode made of non-magnetic material, means for supplying cathode heating current and anode potential, current responsive means in the anode circuit, means for producing an adjustable unidirectional magnetic field parallel to the axis of the tube, a resonant circuit including an inductance and capacitor, the inductance being so positioned relative to the tube that the magnetic field from the inductance is superimposed upon said unidirectional field, and mounting means for positioning said tube, resonant circuit and unidirectional magnetic field in fixed position relative to each other and for moving them as a unit to orient the inductance of the resonant circuit relative to the magnetic component of a radio frequency wave whereby said component may induce directly a current in the inductance of said resonant circuit and modulate the anode circuit.

References Cited in the file of this patent

UNITED STATES PATENTS

| | | |
|---|---|---|
| 1,535,082 | Alexanderson | Apr. 21, 1925 |
| 1,846,888 | McArthur | Feb. 23, 1932 |
| 1,952,899 | Tear | Mar. 27, 1934 |
| 2,057,952 | Jensen | Oct. 20, 1936 |
| 2,096,590 | Linder | Oct. 19, 1937 |
| 2,227,909 | Ohl | Jan. 7, 1941 |
| 2,262,956 | Newbold | Nov. 18, 1941 |
| 2,284,131 | Case | May 26, 1942 |

FOREIGN PATENTS

| | | |
|---|---|---|
| 544,784 | France | Sept. 29, 1922 |
| 189,135 | Great Britain | Mar. 17, 1924 |
| 207,818 | Great Britain | Feb. 19, 1925 |
| 501,048 | Great Britain | Feb. 14, 1939 |